US010657329B2

(12) United States Patent
Kasai

(10) Patent No.: US 10,657,329 B2
(45) Date of Patent: May 19, 2020

(54) SYSTEM AND METHOD FOR RECOMMENDING WORDS FOR INSERTION BASED ON TIMING FACTORS

(71) Applicant: Rakuten, Inc., Tokyo (JP)

(72) Inventor: Akira Kasai, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 503 days.

(21) Appl. No.: 15/329,642

(22) PCT Filed: Jul. 31, 2014

(86) PCT No.: PCT/JP2014/070202
§ 371 (c)(1),
(2) Date: Jan. 27, 2017

(87) PCT Pub. No.: WO2016/016994
PCT Pub. Date: Feb. 4, 2016

(65) Prior Publication Data
US 2017/0212883 A1 Jul. 27, 2017

(51) Int. Cl.
*G06Q 30/00* (2012.01)
*G06F 40/279* (2020.01)
(Continued)

(52) U.S. Cl.
CPC .......... *G06F 40/279* (2020.01); *G06F 16/335* (2019.01); *G06F 16/3323* (2019.01);
(Continued)

(58) Field of Classification Search
CPC .. G06F 40/279; G06F 40/258; G06F 16/3323; G06F 16/9535; G06F 16/335;
(Continued)

(56) References Cited

U.S. PATENT DOCUMENTS

2011/0201387 A1\* 8/2011 Paek ............... G06N 20/00
455/566
2013/0046791 A1\* 2/2013 Markman ......... G06F 16/367
707/794

FOREIGN PATENT DOCUMENTS

JP 2014-21578 A 2/2014

OTHER PUBLICATIONS

Kevin McCarthy, Michael P. O'Mahony, Markus Schaal, Barry Smyth, Ruihai Dong, Towards an Intelligent Reviewer's Assistant: Recommending Topics to Help Users to Write Better Product Reviews, IUI'12, Feb. 14-17, 2012, 159-168 (Year: 2012).*

(Continued)

*Primary Examiner* — Matthew E Zimmerman
(74) *Attorney, Agent, or Firm* — Sughrue Mion, PLLC

(57) ABSTRACT

A recommended word for each category is configured to be extracted from review information in a review database to manage the recommended word. The review database is configured to manage the review information on merchandise or a service in units of categories of the merchandise or the service. A control is configured to be executed such that a review post page on the specified merchandise or service is presented. A determination whether present time is assistance timing or not is configured to be executed based on an aspect of character input to the review post page. In response to an acquisition of a determination result that the present time is the assistance timing, a control is configured to be executed such that the recommended word corresponding to the category to which the specified merchandise or service belongs is presented.

20 Claims, 9 Drawing Sheets

(51) Int. Cl.
    *G06F 16/335*     (2019.01)
    *G06F 16/332*     (2019.01)
    *G06F 16/9535*     (2019.01)
    *G06F 40/258*     (2020.01)
    *G06Q 50/10*     (2012.01)
    *G06Q 30/02*     (2012.01)
    *G06Q 30/06*     (2012.01)

(52) U.S. Cl.
    CPC ........ *G06F 16/9535* (2019.01); *G06F 40/258* (2020.01); *G06Q 30/0282* (2013.01); *G06Q 30/06* (2013.01); *G06Q 30/0631* (2013.01); *G06Q 50/10* (2013.01)

(58) Field of Classification Search
    CPC ............... G06Q 30/0282; G06Q 30/06; G06Q 30/0631; G06Q 50/10
    See application file for complete search history.

(56) References Cited

OTHER PUBLICATIONS

International Search Report for PCT/JP2014/070202, dated Sep. 9, 2014.

\* cited by examiner

FIG. 4

[ACHIEVE RANKING NO.1] BdbifTOUCH PEN STANDARDjQbe/jQipmf/jQpe touch /Ksaiu/Xdskuhgfih/NEWjQbe/nsujh8/ikjiso/NOKESISE KUNDARE HEUISE /SMART PHONE/sdoug/STRAP/jQbe/jQipmf/jQpe touch — p2 p1 p3
RECOMMENDATION DEGREE [REQUIRED]   DISSATISFIED ☆☆☆☆☆ SATISFIED

TITLE OF THE REVIEW   ※WITHIN 20 TWO-BYTE CHARACTERS   — p4

BODY TEXT OF THE MERCHANDISE REVIEW [REQUIRED]
※WRITE REVIEW ABOUT SHOP SUCH AS DELIVERY OR STAFF'S RECEPTION IN SHOP REVIEW
※DO NOT WRITE YOUR IDENTIFICATION SUCH AS YOUR NAME OR EMAIL ADRESS
WRITE REVIEW ABOUT THE MERCHANDISE SUCH AS ITS USABILITY OR DESIGN
p5
COUNT OF INPUT WORD, 0 DOUBLE-BYTE CHARACTER
<NEED MORE 20 TWO-BYTE CHARACTERS TO POST REVIEW>

PROFILE SELECTION [REQUIRED]   ●OPEN   ○CLOSED   — p6

RELATED IMAGE[?] ADDITION :   REFERENCE   — p7 p8
PERSON WHO USES MERCHANDISE  ▼SELECT
PURPOSE OF MERCHANDISE  ▼SELECT   — p9
COUNT FOR PURCHASE [?]  ▼SELECT
p10

GO TO CONFIRMATION SCREEN   — p11

FIG. 5

| REVIEW ID | MERCHANDISE ID | CATEGORY | USER ID | REVIEW INFORMATION |
|---|---|---|---|---|
| 000001 | 111111 | SNEAKERS | 000888 | ×○△×… |
| 000002 | 111111 | SNEAKERS | 001777 | △△□○… |
| ⋮ | ⋮ | ⋮ | ⋮ | ⋮ |
| 111111 | 555555 | SWEET | 991210 | ××△□… |

FIG. 6

| CATEGORY | RECOMMENDED WORD |
|---|---|
| SNEAKERS | ○○×× |
| SNEAKERS | △△×× |
| ⋮ | ⋮ |
| SWEET | ×○△□ |

SYSTEM AND METHOD FOR RECOMMENDING WORDS FOR INSERTION BASED ON TIMING FACTORS

CROSS REFERENCE TO RELATED APPLICATIONS

This is a National Stage of International Application No. PCT/JP2014/070202 filed Jul. 31, 2014, the contents of all of which are incorporated herein by reference in their entirety.

TECHNICAL FIELD

The present invention relates to an information processing device, a method for the information processing device, a program that achieves the information processing device, and a storage medium that stores the program. The present invention especially relates to a technical field to assist a review post on merchandise or a service.

CITATION LIST

Patent Literature

Patent Document 1: Japanese Unexamined Patent Application Publication No. 2014-21578

BACKGROUND ART

As a so-called online shopping, for example, merchandise can be purchased on a shopping site constructed on the Internet.

In the online shopping, the merchandise cannot be actually picked up. Therefore, on the shopping site, review information on the merchandise is presented on a publication page or a similar page of the merchandise to assist a selection of purchased merchandise. The review information is formed into text of, for example, feelings of a user who has actually purchased the merchandise or a similar person about the merchandise (for example, feelings after use of the merchandise or similar feelings), and then is posted. Accordingly, the review information functions as important reference information for the user as a general consumer to select the purchased merchandise.

Patent Literature 1 discloses the system that allows posting and browsing such review information.

SUMMARY OF INVENTION

Technical Problem

The user as a general consumer is a post target for the review information as described above, especially the review information on the shopping site. Accordingly, many users are unaccustomed and have no idea of what information should be described as the review. Therefore, the count of review posts grows slow, and also as the posted review, it is seen that many description contents of the review are insufficient.

To select the purchased merchandise, it is preferred that many feelings can be referred. Therefore, a larger count of review posts is preferred. To cause the review information to function as the important reference information, it is preferable that the review description content be enriched.

Therefore, an object of the present invention is to overcome the above-described problems and appropriately perform the assistance related to the description of the review. This achieves increasing the count of review posts and enriching the review contents.

Solution to Problem

First, an information processing device according to the present invention includes a recommended word managing unit, a post page presentation control unit, an assistance timing determining unit and an assistance presentation control unit. The recommended word managing unit is configured to extract a recommended word for each category from review information in a review database to manage the recommended word. The review database is configured to manage the review information on merchandise or a service in units of categories of the merchandise or the service. The post page presentation control unit is configured to perform control such that a review post page on the specified merchandise or service is presented. The assistance timing determining unit is configured to determine whether present time is assistance timing or not based on an aspect of character input to the review post page. The assistance presentation control unit is configured to perform control such that the recommended word corresponding to the category to which the specified merchandise or service belongs is presented in response to an acquisition of a determination result that the present time is the assistance timing by the assistance timing determining unit.

This performs assistance by presentation of the recommended words according to the category of the merchandise or the service target for review post at an appropriate timing based on the aspect of the character input to the review post page.

Second, with the above-described information processing device according to the present invention, the following is preferable. The assistance timing determining unit is configured to determine whether the present time is the assistance timing or not depending on whether the character input to the review post page has been ceased equal to or more than a predetermined time or not.

It can be inferred that the state where the character input has been ceased equal to or more than the predetermined time is a state where the user who performs the review post has no idea of what content should be described as the review and is confused. In view of this, to handle such a state, the assistance by presentation of the recommended words is allowed.

Third, with the above-described information processing device according to the present invention, the following is preferable. The assistance timing determining unit is configured to determine whether the present time is the assistance timing or not depending on whether a count of input characters to the review post page per unit time is equal to or less than a predetermined count or not.

It can be inferred that the state where the count of input characters per unit time is equal to or less than the predetermined count is a state where the user who performs the review post has no idea of what content should be described as the review and is confused. In view of this, to handle such a state, the assistance by presentation of the recommended words is allowed.

Fourth, with the above-described information processing device according to the present invention, the following is preferable. The assistance timing determining unit is configured to determine whether the present time is the assistance timing or not depending on whether the character input to the review post page and a deletion of the character is repeated equal to or more than a predetermined count or not It can be inferred that the state where the input of the characters and the deletion of the characters are repeated equal to or more than the predetermined count, that is, the state where the rewriting of the review content is repeated equal to or more than the predetermined count is a state where the user who performs the review post has no idea of what content should be described as the review and is confused. In view of this, to handle such a state, the assistance by presentation of the recommended words is allowed.

Fifth, with the above-described information processing device according to the present invention, the following is preferable. The assistance timing determining unit is configured to determine whether the present time is the assistance timing or not depending on whether a count of input characters to the review post page when an input completion button is operated is equal to or less than a predetermined count or not, and the input completion button is to be operated upon completion of the character input to the review post page.

It is more likely that the content of the review whose count of input characters is equal to or less than the predetermined count is not enriched. In view of this, to handle such a state, the assistance by presentation of the recommended words is allowed.

Sixth, with the above-described information processing device according to the present invention, the following is preferable. The assistance timing determining unit is configured to determine whether the present time is the assistance timing or not depending on whether a count of the recommended words in an input character string to the review post page is equal to or less than a predetermined count or not.

It is more likely that the content of the review whose count of recommended words in the input character string is equal to or less than the predetermined count is not enriched. In view of this, to handle such a state, the assistance by presentation of the recommended words is allowed.

Seventh, with the above-described information processing device according to the present invention, the following is preferable. The recommended word managing unit is configured to extract the recommended word for each of the categories setting one condition, the one condition being that the recommended word is a phrase frequently appearing in the review information of the category of an extraction target.

It is more likely that the phrases frequently appear in the review information for each category are keywords on the merchandise or the service of this category. The extraction of the phrases as the recommended words allows presenting phrases important to ensure the enriched description content of the review on the merchandise or the service of this category.

Eighth, with the above-described information processing device according to the present invention, the following is preferable. The recommended word managing unit is configured to continuously extract the recommended word at certain time interval.

For example, when new merchandise or a new service is released, this allows newly extracting and managing phrases for evaluation on the merchandise or the service as the recommended words.

An information processing method according to the present invention is performed by an information processing device. The information processing method includes a recommended word managing step, a post page presentation control step, an assistance timing determining step, and an assistance presentation control step. The recommended word managing step extracts a recommended word for each category from review information in a review database to manage the recommended word. The review database is configured to manage the review information on merchandise or a service in units of categories of the merchandise or the service. The post page presentation control step performs a control such that a review post page on the specified merchandise or service is presented. The assistance timing determining step determines whether present time is assistance timing or not based on an aspect of character input to the review post page. The assistance presentation control step performs a control such that the recommended word corresponding to the category to which the specified merchandise or service belongs is presented in response to an acquisition of a determination result that the present time is the assistance timing by the assistance timing determining step.

Similar to the above-described information processing device according to the present invention, the information processing method according to the present invention also performs assistance by presentation of the recommended words according to the category of the merchandise or the service target for review post at an appropriate timing based on the aspect of the character input to the review post page.

Furthermore, a program according to the present invention is a program that causes an information processing device to perform the process performed as the information processing method.

Furthermore, a storage medium according to the present invention is a program storing the program. These program and storage medium achieve the above-described information processing device.

Advantageous Effects of Invention

According to the present invention, the assistance related to the description of the review can be appropriately performed. This achieves increasing the count of review posts and enriching the review contents.

BRIEF DESCRIPTION OF THE DRAWINGS

FIG. 4 is a drawing illustrating an example of a layout of a review post page;

FIG. 5 is a drawing illustrating an example of storage information in a review database;

FIG. 6 is a drawing illustrating an example of storage information in a recommended word database;

DESCRIPTION OF THE EMBODIMENTS

The following describes embodiments in the order listed below.
<1. Network System>
<2. Hardware Configuration of Computer Device>
<3. Functions Related to Review Post>
<4. Process Procedure>
<5. Summary of Embodiments>
<6. Programs and Storage Medium>
<7. Modifications>

1. Network System

Figure 1:
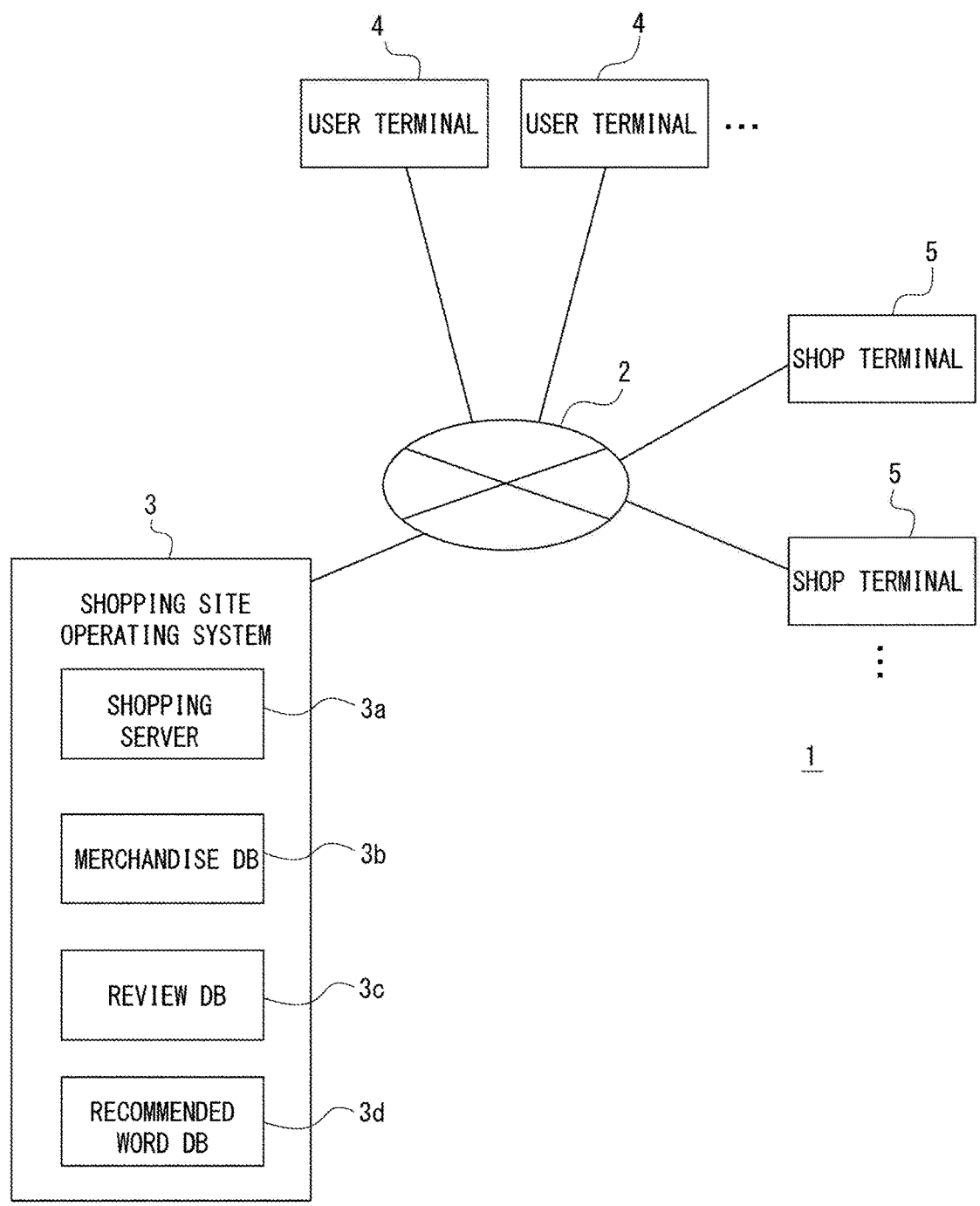
FIG. 1 is a drawing illustrating an example of a network system of an embodiment.

FIG. 1 illustrates an example of a network system 1 assumed in this embodiment. This network system 1 functions as an electronic commerce (EC) system.

In the network system 1, a shopping site managing system 3, a plurality of user terminals 4, 4 and so on and a plurality of shop terminals 5, 5 and so on are constituted so as to be communicable with one another over a network 2 as, for example, the Internet.

The user terminal 4 is a computer device including a web browser. As the user terminal 4, for example, a high-function mobile phone (a smart phone), a mobile phone, a portable information terminal (PDA), and a mobile or a desktop personal computer (PC) are listed. Note that the type of the user terminal 4 is not limited to these.

The user terminal 4 transmits a Hypertext Transfer Protocol (HTTP) request to the shopping site operating system 3 to request the web page and a predetermined process. Additionally, the user terminal 4 receives the web page transmitted in response to the HTTP request and displays the web page on the web browser. This allows a user to browse and operate desired web pages.

The shopping site operating system 3 includes a shopping server 3a, a merchandise database (DB) 3b, a review DB 3c, and a recommended word DB 3d, which are each configured by the computer devices. These respective devices are communicable with one another, for example, via a network such as a Local Area Network (LAN).

The shopping server 3a performs various processes based on the HTTP request, which is transmitted from the user terminal 4. The shopping server 3a, for example, creates and transmits various web pages (for example, a merchandise web page, a shopping cart web page, and an order web page) and performs a purchase process or a similar process in response to an order confirmation operation by the user.

The network system 1 provides a web site for virtual mall (an EC site) to the user (the user of the user terminal 4) by the shopping server 3a. In the EC site, a plurality of shops (member shops of the virtual mall) are present. Staff members at the shops each register merchandise of their own shops via the computer device as the shop terminal 5. This uploads the various pieces of merchandise from the various shops on the EC site. The user can access the EC site from the user terminal 4 and purchase desired merchandise.

The merchandise DB 3b stores information on merchandise registered via the shop terminal 5. Specifically, the merchandise DB 3b stores merchandise information such as a merchandise name, a category of the merchandise, the image of the merchandise, specifications, and a summary for introducing the merchandise; advertising information; or similar information, which are made to correspond to a merchandise ID. The merchandise ID is an identifier to identify the merchandise. The merchandise DB 3b also stores, for example, files of the merchandise web pages described in a markup language, such as a HyperText Markup Language (HTML) and an Extensible Markup Language (XML), or a similar language.

Such merchandise DB 3b allows, for example, merchandise search based on an input keyword or a similar keyword.

Here, the user can perform member registration to the shopping site managing system 3 to use the EC site. For member registration, the user registers required information such as a user ID (user identification information), addressee information of merchandise (address information), and a credit card number. The user logs in to the EC site with the registered user ID. This eliminates a labor of inputting the required information again to purchase the merchandise on the EC site.

Upon request from the user terminal 4, the shopping server 3a transmits a web page to post a review on the merchandise (hereinafter referred to as a "review post page").

The review post page is prepared for each piece of merchandise, the shopping server 3a transmits the review post page on the merchandise, which is instructed by the user terminal 4. The details of the review post page will be described later.

Here, a predetermined web page in the EC site managed by the shopping server 3a includes a button (a URL link) to request the review post page. Specifically, in this example, this button is disposed for each piece of merchandise on a purchase log page. The purchase log page inserts a list of merchandise purchased by the user in the past. The user clicks a button disposed corresponding to the merchandise on which the user intends to perform the review post among buttons disposed on the purchase log page. This allows the user to request (instruct) transmission of the review post page on desired merchandise among the purchased merchandise.

In this example, each merchandise web page also includes the button to request the review post page. By accessing a desired merchandise web page and clicking this button, the user can also request (instruct) the transmission of the review post page on the desired merchandise.

The shopping server 3a causes the review DB 3c to store and manage the review information posted from the review post page.

The details of the review DB 3c will be described later.

Some review information stored in the review DB 3c is inserted in the merchandise web page.

Specifically in this example, each merchandise web page inserts at least equal to or more than one piece of review information among the review information posted on the merchandise inserted into this merchandise web page. More specifically, an insertion area for review information is disposed at a part of an area in the merchandise web page. When the shopping server 3a receives a request of the merchandise web page from the user terminal 4, the shopping server 3a creates an HTML file as an HTML file of this merchandise web page in this insertion area. An instruction to acquire and insert some review information among the review information on the merchandise inserted into this merchandise web page stored in the review DB 3c is described in the HTML file. This HTML file is transmitted to the user terminal 4 of a request source.

The merchandise web page also includes a button to browse another review information other than the review information inserted in the above-described insertion area among the review information on the merchandise inserted into this merchandise web page. In response to the click on this button, the shopping server 3a creates data to present a review browse page and transmits this data to the corresponding user terminal 4. The review browse page is to browse the review information posted on this merchandise. In view of this, the user can refer the review information other than the review information initially presented on the merchandise web page to sufficiently examine the selection of the purchased merchandise.

The recommended word DB 3d is a DB that stores recommended words as phrases preferably described in the review.

The details of the recommended word DB 3d will be described later again.

In FIG. 1, various examples are assumed as configurations of the network 2. As the configuration, for example, the Internet, an intranet, an extranet, a Local Area Network (LAN), a Community Antenna TeleVision (CATV) communications network, a Virtual Private Network, a telephone network, a mobile communications network, a satellite communications network, or a similar network is assumed. Various examples are also assumed as transmission medium configuring all or a part of the network 2. The transmission medium, for example, can be a wire such as an Institute of Electrical and Electronics Engineers (IEEE) 1394, a Universal Serial Bus (USB), a power-line carrier, a telephone line; and also a wireless such as infrared light like Infrared Data Association (IrDA), Bluetooth (registered trademark), 802.11 wireless, a mobile telephone network, a satellite channel, and a digital terrestrial broadcasting network.

2. Hardware Configuration of Computer Device

Figure 2:
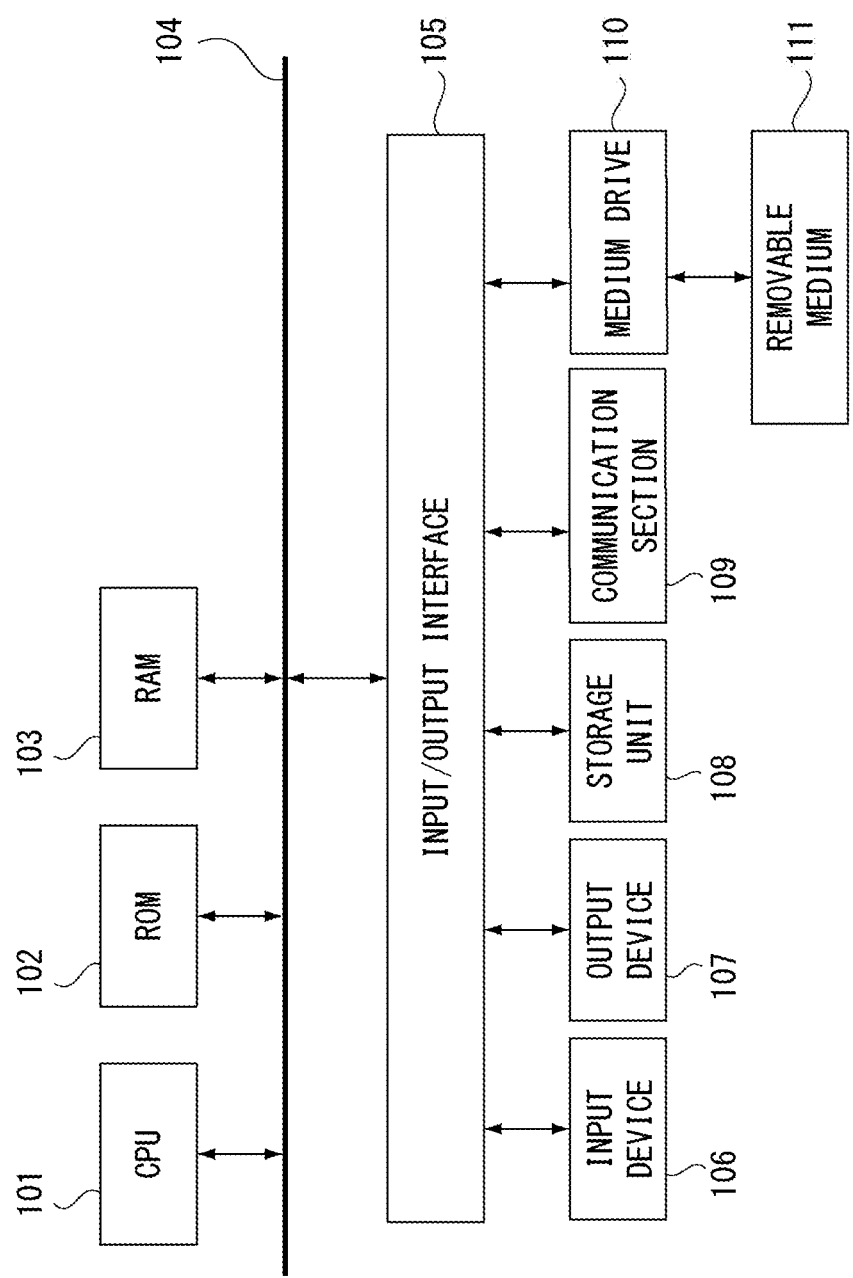
FIG. 2 is a block diagram of a computer device of the embodiment.

FIG. 2 illustrates the hardware configuration of the computer devices constituting the respective devices, which is illustrated in FIG. 1, such as the shopping server 3a (the merchandise DB 3b, the review DB 3c, the recommended word DB 3d, the user terminal 4, and the shop terminal 5).

In FIG. 2, a Central Processing Unit (CPU) 101 of a computer device performs various processes in accordance with a program stored in a Read Only Memory (ROM) 102 or a program loaded from a storage unit 108 to a Random Access Memory (RAM) 103. The RAM 103 also appropriately stores data required for the CPU 101 to perform various processes or similar data.

The CPU 101, the ROM 102, and the RAM 103 are mutually coupled via a bus 104. To this bus 104, an input/output interface 105 is also coupled.

To the input/output interface 105, an input device 106 formed of a keyboard, a computer mouse, a touchscreen, and a similar component, a display (a display device) formed of a Liquid Crystal Display (LCD), a Cathode Ray Tube (CRT), an organic Electroluminescence (EL) panel, and a similar component, an output device 107 formed of a speaker and a similar component, the storage unit 108 formed of a Hard Disk Drive (HDD), a flash memory device, and a similar component, and a communication unit 109 mutually communicates with an external device are coupled.

Additionally, to the input/output interface 105, a medium drive 110 is coupled as necessary and a removable medium 111, such as a magnetic disk, an optical disk, a magneto-optical disk, or a semiconductor memory is appropriately mounted to write and read information to/from the removable medium 111.

Such computer device can upload and download data and a program through communications by the communication unit 109 and exchange the data and the program via the removable medium 111.

When the CPU 101 performs process operations based on various programs, especially the computer device as the shopping server 3a performs an information process and communications described later.

3. Functions Related to Review Post

Subsequently, the following describes various functions related to the review post among the functions that the shopping server 3a has with reference to FIG. 3 to FIG. 8.

Figure 3:
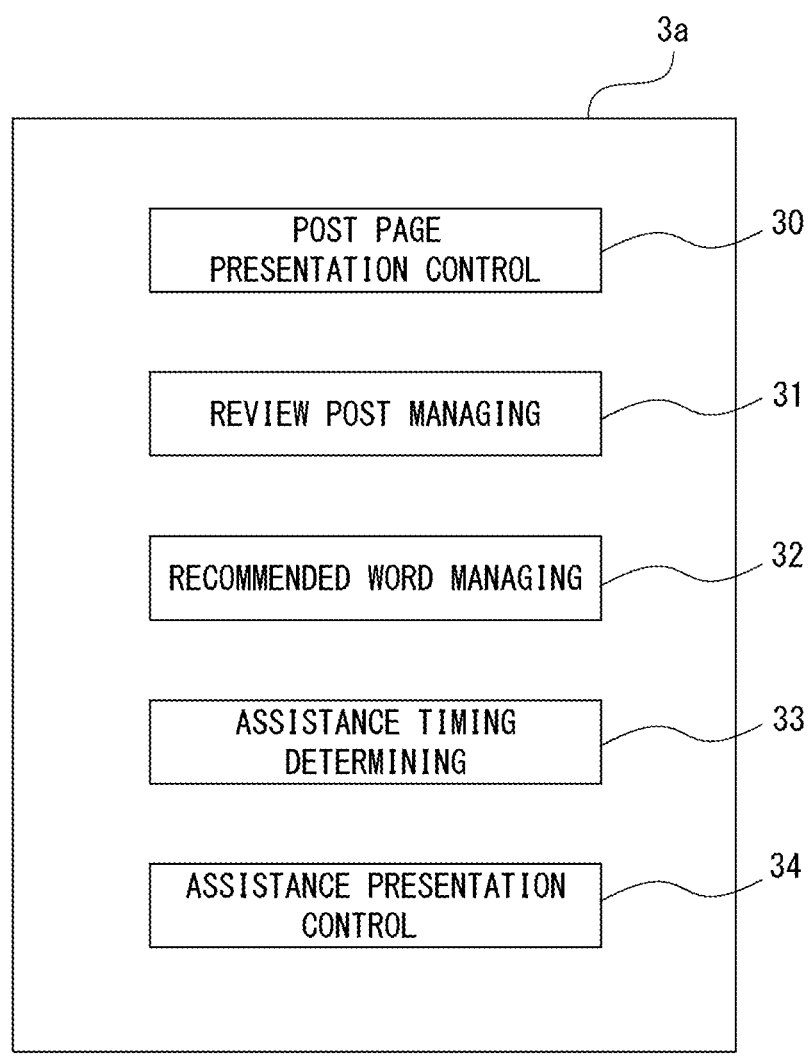
FIG. 3 is a function block diagram illustrating blocked functions related to a review post owned by an information processing device of the embodiment.

FIG. 3 is a function block diagram illustrating blocked functions related to the review post owned by the shopping server 3a.

As illustrated in FIG. 3, as the functions related to the review post, the shopping server 3a has the respective functions as a post page presentation control unit 30, a review post managing unit 31, the recommended word managing unit 31, an assistance timing determining unit 33, and an assistance presentation control unit 34.

The post page presentation control unit 30 performs control such that the review post page on the merchandise instructed by the user is presented. An instruction of the review post page on certain merchandise is performed by clicking the button, which is disposed on the predetermined web page in EC site, by the user as described above.

FIG. 4 illustrates an example of a layout of the review post page.

As illustrated in the drawing, the review post page presents information on a merchandise image p1 and a merchandise name p2. The review post page also presents a recommendation degree input box p3, a title input box p4, a body text input box p5, a profile selection box p6, an image addition box p7, and input boxes p8, p9, and p10 as items input by the user. The recommendation degree input box p3 is to input a degree of recommendation. The title input box p4 is to input the title of the review. The body text input box p5 is to input the body text of the merchandise review. The profile selection box p6 is to select and input whether to publish or withhold profile information. The image addition box p7 is to additionally input a relevant image. The user of the merchandise, how to use the merchandise, and the count of purchases are input to the respective input boxes p8, p9, and p10.

Furthermore, the review post page presents a transition instruction button p11. The transition instruction button p11 is to instruct a transition to a confirmation screen. The confirmation screen is to confirm the information input to this review post page.

As the merchandise image p1 and the merchandise name p2, the merchandise images on the merchandise instructed as target merchandise for review post and the information of the merchandise names are each read from the merchandise DB 3b, which is illustrated in FIG. 1, and are presented.

The recommendation degree input box p3 is a box to input the extent of the degree of recommendation by a count of stars in this example. Specifically, clicking any of star frames among a plurality of presented star frames allows inputting the degree of recommendation. At this time, colored display from the star frame on the left end to the clicked star frame visually shows the degree of recommendation by the count of stars.

Characters can be input to the title input box p4 and the body text input box p5. For example, the count of characters is restricted within 20 two-byte characters for the title input box p4 and equal to or more than 20 two-byte characters for the body text input box p5. If not meeting these restriction conditions, the post of the review is not accepted.

The profile selection box p6 includes a checkbox to select and input publication and a checkbox to select a non-disclosure. When the user clicks any of the checkboxes, publication/non-disclosure of the profile information (predetermined information such as a sex and an age among information registered by the user) can be selected and input.

The image addition box p7 is a box to which information on a directory storing a relevant image to be added among directories readable by the user terminal 4 is input. In this example, the "Refer To" button is provided with the image addition box p7. When the user clicks this "Refer To" button, the directories readable by the user terminal 4 can be referred, and among the directories, the required directory is selectable.

The input boxes p8, p9, and p10 are boxes to each select and input items with a pulldown method. By clicking the input boxes p8, p9, and p10, the user can present the list of candidates for each item. This allows the user to specify the item of input target by selecting the corresponding candidate from this list.

On the review post page, the degree of recommendation, the review body text, and the profile selection are required. That is, the post of the review on which these items are not input is not accepted.

The transition instruction button p11 is a button that is to be operated after inputting at least the required items. In this meaning, the transition instruction button p11 can be simply referred to as an "input completion button" that is to be operated upon completion of the character input to the review post page.

Referring again to FIG. 3, the review post managing unit 31 performs a process of a screen presentation control in response to the operation to the transition instruction button p11 on the review post page. The review post managing unit 31 also performs a process to store the information input to the review post page in the review DB 3c as the review information.

Specifically, in response to the operation to the transition instruction button p11 on the review post page, the review post managing unit 31 performs control such that the web page as a confirmation screen that inserts the input information to this review post page is presented on the user terminal 4. In response to the operation to the post button, which is disposed on the web page as this confirmation screen, the review post managing unit 31 performs control such that the web page as a post completion screen, which inserts a message such as "The post has been accepted." is presented.

In the case where the required item is not input to the review post page and the above-described restriction condition on the count of characters is not met although the required items are input when operating the transition instruction button p11 on the review post page, the review post managing unit 31 performs an input NG process. Specifically, for example, the review post managing unit 31 performs control such that the user terminal 4 presents the web page as an NG screen, which inserts a reason for NG (a message such as "The required item is not input." and "The restriction condition on the count of characters is not met."), to prompt retry of the input to the review post page.

In response to the operation of the post button on the above-described confirmation screen, the review post managing unit 31 performs a process to store the input information to the review post page in the review DB 3c as the review information.

FIG. 5 illustrates the example of storage information in the review DB 3c.

As illustrated in the drawing, in the review DB 3c, respective information of a review ID, a merchandise ID, a category to which the merchandise belongs, and a user ID are made to correspond to the review information. That is, the review post managing unit 31 makes the respective information of the review ID, the merchandise ID, the category to which the merchandise belongs, and the user ID correspond to the review information and stores the information in the review DB 3c.

The review ID is identification information given to each piece of review information by the review post managing unit 31 such that the individual review information can be identified. The merchandise ID is information on the merchandise ID given to the merchandise instructed as the target for the review post by the user. The category is the information on the category made to correspond to this merchandise ID in the merchandise DB 3b. The user ID is information on the user ID for the user who has input the review information and has operated the above-described post button.

Referring again to FIG. 3, a recommended word managing unit 32 extracts the recommended words for each category from the review information in the review DB 3c and manages the recommended words.

Here, the recommended word means a phrase preferably described as the review of the merchandise belonging to the category for each merchandise category (preferable in terms of enriching the review content). As the example of the recommended words, the following can be listed.

Category classified into clothing, such as "suit" and "outer" . . . texture, tone, size, or a similar word Category classified into confectionery, such as "western pastry" and "Japanese pastry" . . . sweetness, oral sensation, amount (size), or a similar word Category classified into a wireless input device group, such as "wireless mouse" and "wireless keyboard" . . . durability of cells, stability of wireless connection, or a similar word The recommended words, which are extracted by the recommended word managing unit 32, are presented to the user at an appropriate timing by the assistance timing determining unit 33 and the assistance presentation control unit 34, which are described later.

Here, the information on category is possibly: the case where only one is made to correspond to each piece of merchandise and the case where a plurality of pieces of information is made to correspond to each piece of merchandise.

In the former case, for example, the categories are classified by classification depending on an individual specific type of the merchandise (for example, in the case of shoes, such as "sneakers", "sandals", and "business shoes"), in other words, the case where the category is classified by a comparatively subordinate concept.

In the latter case, the categories are hierarchically classified. For example, to describe with the above-described example of shoes, as the category of more superordinate concept, "women's shoes", "men's shoes", or a similar word is used. As a category of further superordinate concept, the category such as "fashion" is set.

In the case where only one category is made to correspond to each merchandise, the recommended word managing unit 32 extracts the recommended words targeting only the review information to which this category is made correspond in the review DB 3c.

Meanwhile, in the case where the plurality of categories are made to correspond to each merchandise, the recommended word managing unit 32 extracts the recommended words targeting, for example, only the category of the most subordinate concept among the plurality of categories. Depending on the merchandise, if narrowing down the recommended words target for the extraction to the most subordinate concept, a count of target review information becomes less. This possibly fails to appropriately extract the recommended words. For example, it is considered that regarding such merchandise, the category in further superordinate concept hierarchy is set as the extraction target for the recommended words.

For convenience of explanation, the following assumes that only one piece of information on the category is made to correspond to each piece of merchandise.

In this example, the recommended word managing unit 32 extracts the recommended words by detecting frequent words in the review information for each category.

The recommended word managing unit 32 detects the frequent words, for example, targeting the information of the review body text in the review information and makes a specific phrase detectable for each category target for extraction. Accordingly, a phrase assumed to be frequently used in other categories as well (hereinafter referred to as a "common frequent word") is omitted. Specifically, an omit list listing such common frequent words is prepared. The frequent words are detected from the review information on the merchandise belonging to the extraction target category targeting the phrase other than the common frequent words, which are included in this omit list.

For example, the method allows appropriately extracting the frequent words specific to the category as the recommended words for this category. The frequent word specific to each category is more likely to be keywords for the merchandise of this category. Accordingly, making such frequent words detectable allows extracting important phrases as the recommended words for this category to enrich the review content.

The method for extracting the recommended words is not limited to the detection of the frequent words as described above, but various methods are possible. For example, the following extraction based on the keyword is also possible. A keyword is preset to each category in advance. Then, phrases including this keyword or phrases whose meaning or character is similar are extracted from the review information on the category target for extraction.

The recommended word managing unit 32 stores the recommended words, which are extracted as described above, in the recommended word DB 3d.

FIG. 6 illustrates the example of the storage information on the recommended word DB 3d.

The recommended word DB 3d stores the recommended words made to correspond to the categories. That is, the recommended word managing unit 32 makes the recommended words extracted for each category correspond to the information on the category target for extraction and stores the recommended words in the recommended word DB 3d.

Here, in this example, the recommended word managing unit 32 continuously performs the extraction of the recommended words and the storage to the recommended word DB 3d, for example, regularly, such as every few days, or at certain time interval, such as performance each time that the count of review posts increases by a predetermined count.

Thus, the continuous performance of the extraction of the recommended words and the storage to the recommended word DB 3d allows the following. For example, when new merchandise is released, phrases for evaluation on a new function of the merchandise are newly extracted and managed as the recommended words. This allows catching up with the latest trend of the merchandise dealt in the virtual mall.

To store the frequent words sequentially acquired by this continuous extraction process in the recommended word DB 3d, the recommended word managing unit 32 additionally stores only the frequent words other than the frequent words already stored in the recommended word DB 3d in the recommended word DB 3d.

In FIG. 3, the assistance timing determining unit 33 determines whether the present time is assistant timing or not based on an aspect of the character input to the review post page. The assistance timing means timing when assist presentation by the presentation of the recommended words should be performed as the assist presentation to assist the description of review.

In this example, the assistance timing determining unit 33 determines whether the present time is the assistance timing or not based on the aspect of character input to the body text input box p5 on the review post page.

The assistance timing determining unit 33 performs a determination process as follows as the determination process to determine whether the present time is the assistance timing or not.

(1) Whether the character input to the body text input box p5 has ceased equal to or more than a predetermined time or not (2) Whether a count of characters input to the body text input box p5 per unit time is equal to or less than a predetermined count or not (3) Whether the input of characters to the body text input box p5 and deletion of these characters are repeated by equal to or more than the predetermined count or not (4) Whether the count of input characters to the body text input box p5 when operating the transition instruction button p11 (the input completion button) is equal to or less than the predetermined count or not (5) Whether the count of the recommended words in the input character string to the body text input box p5 is equal to or less than the predetermined count or not Here, the shopping server 3a creates page data as page data of the review post page by the above-described post page presentation control unit 30. Into the page data, code information (for example, code information in JavaScript or a similar language) is embedded. In the code information, an instruction to cause the shopping server 3a to transmit the characters input to the body text input box p5 and the deletion information of the input characters is described. The shopping server 3a transmits the page data to the user terminal 4 as the request source.

This sequentially transmits the character information input to the body text input box p5 by the user and the deletion information to the shopping server 3a.

The determination processes (1) to (5) are thus performed based on the input character information to the body text input box p5 and the deletion information sequentially transmitted from the user terminal 4.

In the determination process (1), it can be inferred that the state where the character input to the body text input box p5 has been ceased equal to or more than the predetermined time is a state where the user who performs the review post has no idea of what content should be described as the review content and is confused. In view of this, this determination process (1) can appropriately perform the determination whether the present time is the assistance timing or not.

In this example, in the determination process (1), as the "predetermined time", for example, "one minute" is set. The determination process (1) determines whether the character input to the body text input box p5 has been ceased equal to or more than one minute or not.

In the determination process (2), it can be inferred that the state where the count of input characters to the body text input box p5 per unit time is equal to or less than the predetermined count is a state where the user who performs the review post has no idea of what content should be described as the review content and is confused. In view of this, this determination process (2) can appropriately perform the determination whether the present time is the assistance timing or not.

In the determination process (2) in this example, as the "unit time" and "the count of input characters", for example, "three minutes" and "ten characters" are set, respectively. The determination process (2) determines whether the count of input characters to the body text input box p5 for three minutes is equal to or less than ten characters or not.

Simply, it can be said that the determination process (3) is a process to determine whether rewriting of the review content is repeated equal to or more than a predetermined count or not. It can be inferred that the state where the rewriting of the review content is thus repeated equal to or more than the predetermined count is a state where the user who performs the review post has no idea of what content should be described as the review and is confused. In view of this, this determination process (3) can appropriately perform the determination whether the present time is the assistance timing or not.

In the determination process (3) in this example, as the "predetermined count", for example, "ten times" is set. The determination process (3) determines whether the input of characters to the body text input box p5 and the deletion of these characters are repeated equal to or more than ten times or not.

The determination process (4) is a determination process started upon operation of the transition instruction button p11 on the review post page. Simply, it can be said that this determination process is a process to determine whether the count of input characters of the review whose input has been completed by the user is equal to or less than the predetermined count or not.

The content of the review whose count of input characters is equal to or less than the predetermined count is more likely to be not enriched. The determination process (4) can determine whether the review to which the input is determined as completed is the review whose content is not enriched thus or not. In view of this, this determination process (4) can appropriately perform the determination whether the present time is the assistance timing or not.

The determination process (4) in this example sets, for example, "30 characters (30 two-byte characters)" as "the count of input characters". The determination process (4) determines whether the count of input characters in the body text input box p5 when operating the transition instruction button p11 is equal to or less than 30 characters or not.

The determination process (5) focuses on the count of contained recommended words in the character string input as the review. In this example, similar to the determination process (4), as the "input character string", this determination process (5) also targets the input character string when operating the transition instruction button p11. That is, the determination process (5) targets the input character string in the review information to which the input by the user is determined as completed.

The determination process (5) in this example determines whether the count of recommended words in the input character string to the body text input box p5 when operating the transition instruction button p11 is, for example, equal to or less than 1 or not.

It is more likely that the content of the review whose count of recommended words in the input character string is equal to or less than the predetermined count is not enriched. The determination process (5) can determine whether the review to be posted is the review whose content is not enriched thus or not. In view of this, this determination process (5) can appropriately perform the determination whether the present time is the assistance timing or not.

To describe for confirmation, the "recommended word" used in the determination process (5) is the recommended word made to correspond to the category to which the merchandise instructed as the target for review post (that is, the merchandise whose merchandise name is presented on the review post page) belongs among the recommended words stored in the recommended word DB 3d.

To acquire such "recommended word", the assistance timing determining unit 33 first refers to the merchandise DB 3a to acquire the information on the category made to correspond to the merchandise, which is instructed as the target for review post. Then, among the recommended words stored in the recommended word DB 3d, the recommended word made to correspond to this acquired category is acquired.

The case where only one category is made to correspond to the merchandise is assumed in the above description. In the case where the categories are hierarchically classified and the plurality of categories are made to correspond to the merchandise, the categories to which the above-described "merchandise instructed as the target for review post" belong are plural. Accordingly, to accurately acquire the corresponding recommended words from the recommended word DB 3d, it is necessary to specify which category is the category determined as the target for extracting the recommended words among the plurality of categories (note that the information on the categories stored in the recommended word DB 3d is only the categories determined as the extraction target in the extraction process of the recommended words by the recommended word managing unit 32).

To specify which category is the category determined as the target for extracting the recommended words among the categories thus made to correspond to the merchandise, for example, the use of extraction target category specification information is considered. To the extraction target category specification information, the information on the category target for extracting the recommended words for each piece of merchandise is made correspond.

Specifically in the case, to perform the determination process (5), first, the extraction target category specification information is referred to acquire the category made to correspond to the merchandise ID of the merchandise instructed as the review post target. Then, the recommended word DB 3*d* is referred to acquire the recommended words made to correspond to this acquired category.

Alternatively, a method not using such extraction target category specification information but that gives the identification information to the category corresponding to the extraction target category in the merchandise DB 3*b* to notify the correspondence can also be employed. In the case, to perform the determination process (5), the merchandise DB 3*b* is referred to acquire the category to which the above-described identification information is given among the categories made to correspond to the merchandise ID of the merchandise specified as the review post target. Thus, the recommended words made to correspond to this acquired category are acquired from the recommended word DB 3*d*.

Subsequently, the following describes the assistance presentation control unit 34.

Upon acquisition of a determination result that the present time is the assistance timing by the assistance timing determining unit 33, the assistance presentation control unit 34 performs control such that the recommended words corresponding to the category to which the merchandise specified as the target for review post belongs are presented. Specifically, the assistance presentation control unit 34 performs control such that the user terminal 4 presents the web page as an assistance screen a, which inserts the corresponding recommended words.

Here, among the determination processes by the assistance timing determining unit 33, a stage where the determination result that the present time is the assistance timing is acquired by the above-described determination processes (1) to (3) is a stage before operating the transition instruction button p11. Meanwhile, a stage where the determination result that the present time is the assistance timing is acquired by the above-described determination processes (4) and (5) is a stage after operating the transition instruction button p11.

Figure 7:
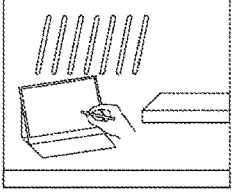
FIG. 7 is a drawing illustrating an example of an assistance screen.

According to these differences, the assistance presentation control unit 34 displays different assistance screens a in the cases where: any of determination processes (1) to (3) acquires the determination result that the present time is the assistance timing, and the determination process (4) or (5) acquires the determination result that the present time is the assistance timing. Specifically, in the case where any of the determination processes (1) to (3) acquires the determination result that the present time is the assistance timing, the presentation control of an assistance screen a1, which is illustrated in FIG. 7, is performed. In the case where the determination process (4) or (5) acquires the determination result that the present time is the assistance timing, the presentation control of an assistance screen a2, which is illustrated in FIG. 8, is performed.

Figure 8:
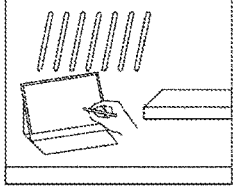
FIG. 8 is a drawing illustrating an another example of assistance screen.

As illustrated in FIG. 7 and FIG. 8, these assistance screens a1 and a2 both presents a message as a message p20 to notify the presence of the recommended word desired to be used for the review, such as "Need assistance on the described content? The following is the recommended words for this merchandise review." As a recommended word list p21, the recommended words corresponding to the category to which the merchandise specified as the target for review post belongs are presented among the recommended words stored in the recommended word DB 3*d*.

The assistance screen a1 presents a close button p22 together with the message p20 and the recommended word list p21. The close button p22 represents the character information such as "Close the Window."

Meanwhile, the assistance screen a2 presents a rewriting instruction button p23 and a continue button p24 together with the message p20 and the recommended word list p21. On the rewriting instruction button p23, the character information such as "Rewrite the Review" is represented. On the continue button p24, the character information such as "Continue" is represented.

In this example, the assistance presentation control unit 34 performs control such that these assistance screens a1 and a2 are both presented on the review post page in a pop-up window format.

When operating the close button p22 on the assistance screen a1, the user terminal 4 closes the window as the assistance screen a1.

Accordingly, a screen presentation state on the user terminal 4 is returned to a state immediately before the presentation of the assistance screen a1, that is, the presentation state of the review post page. The user can edit the input information to the body text input box p5 based on the recommended words presented on the assistance screen a1.

When operating the rewriting instruction button p23 on the assistance screen a2, the user terminal 4 closes the window as the assistance screen a2. Then, the user can edit the input information to the body text input box p5 based on the recommended words presented on the assistance screen a2.

Meanwhile, when operating the continue button p24 on the assistance screen a2, after the user terminal 4 closes the window as the assistance screen a2, the presentation page on the user terminal 4 transitions from the review post page to the web page as the above-described confirmation screen.

That is, upon operation of the continue button p24, the above-described review post managing unit 31 takes over the process from the assistance presentation control unit 34. This performs the processes subsequent to the presentation control of the confirmation screen on this review post page. As described above, the review post managing unit 31 performs the control such that the user terminal 4 presents the web page as the confirmation screen that inserts the input information to the review post page. Additionally, upon operation of the post button, which is disposed on the web page as this confirmation screen, the review post managing unit 31 performs the control such that the web page as the post completion screen that inserts a message such as "The post has been accepted." is presented. In this respect, upon operation of the post button on the above-described confirmation screen, the review post managing unit 31 performs a process to store the input information to the review post page in the review DB 3*c* as the review information.

The function of the shopping server 3*a* described above allows the user to receive assistance involving the presentation of the recommended words by the assistance screen a as the assistance related to the review description when the user posts the review. The above-described determination processes (1) to (5) determine whether such assistance screen a is presented or not, that is, whether the present time is assistant timing or not. This allows the user to receive the assistance related to the review description at the appropriate timing.

The description exemplifies the case where all the determination processes (1) to (5) determine whether the present time is the assistance timing or not based on the information on the input characters sequentially transmitted from the user terminal 4 and the deletion information of the input characters. However, among the determination processes (1) to (5), the determination processes (4) and (5), which target the character input aspect when operating the transition instruction button p11, need not to perform the determination process based on the information on the input characters sequentially transmitted from the user terminal 4 and the deletion information of the input characters.

For example, assume the case where the user terminal 4 is designed to upload the character information input to the review post page on the shopping server 3a upon operation of the transition instruction button p11. The above-described determination processes (4) and (5) do not refer to the information on the input characters, which is sequentially transmitted from the user terminal 4, and the deletion information of the input characters under the state of presenting the review post page. However, the determination processes (4) and (5) can perform determination on the above-described count of input characters and count of recommended words with reference to the input character information uploaded upon operation of the transition instruction button p11.

In the above-described description, the determination process (5) needs not to always target the input characters when operating the transition instruction button p11.

For example, the determination process (5) can also be a process that determines whether the count of recommended words in the input character string to the body text input box p5 when the count of input characters to the body text input box p5 becomes the predetermined count or more (for example, equal to or more than 30 two-byte characters) is equal to or less than the predetermined count (for example, equal to or less than 1) or not.

Alternatively, the determination process (5) can also be a process that determines whether the count of recommended words in the input character string to the body text input box p5 after a lapse of predetermined time from a time point of starting the character input to the body text input box p5 or a time point at which the character input is enabled (for example, after a lapse of three minutes) is equal to or less than the predetermined count (for example, equal to or less than 1) or not.

Whenever any of these determination processes are employed, it is all the same that the determination process is the process that determines whether the count of recommended words in the input character string to the body text input box p5 is equal to or less than the predetermined count or not.

In the case where the determination process (5) is configured to be any of the above-described two determination processes, when any of these two determination processes determine that the present time is the assistance timing, the assistance presentation control unit 34 performs control such that not the assistance screen a2, which is illustrated in FIG. 8, but the assistance screen a1, which is illustrated in FIG. 7, is presented (because, in this case, the assistance timing is before operating the transition instruction button p11).

Here, a method to acquire the recommended words presented by the assistance screen a is similar to the method for acquiring the recommended words by the above-described determination process (5); therefore, the overlapped explanation is avoided.

4. Process Procedure

The following describes a specific procedure of processes performed to achieve the functions of the shopping server 3a as the embodiment described above with reference to the flowcharts in FIG. 9 to FIG. 11.

Figure 9:
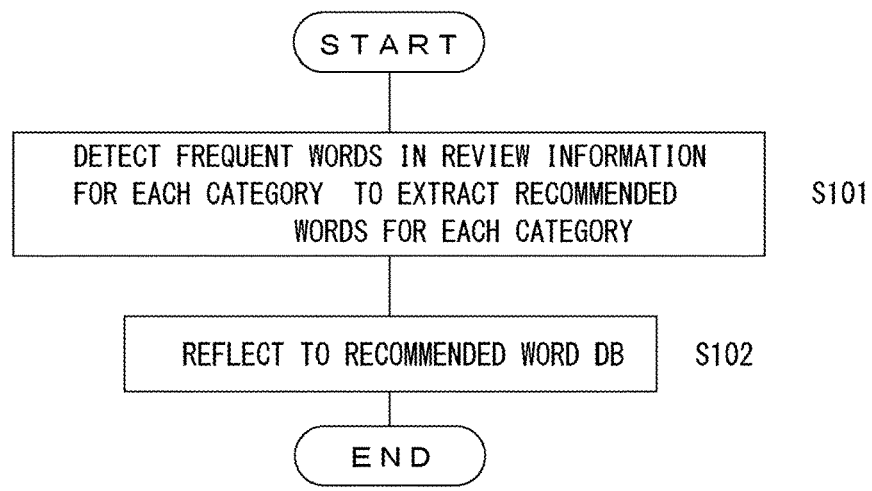
FIG. 9 is a flowchart showing a specific process procedure to achieve functions of a frequent word managing section.
Figure 10:
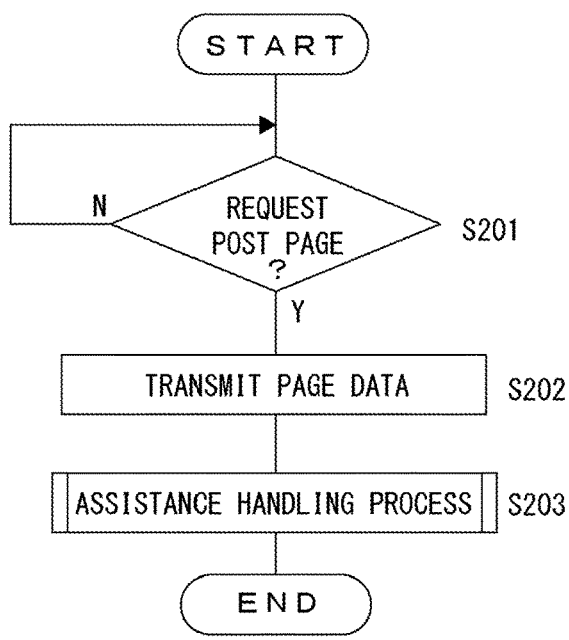
FIG. 10 is a flowchart for describing a process procedure to achieve functions as a post page presentation control section, an assistance timing determining section, and an assistance presentation control section.
Figure 11:
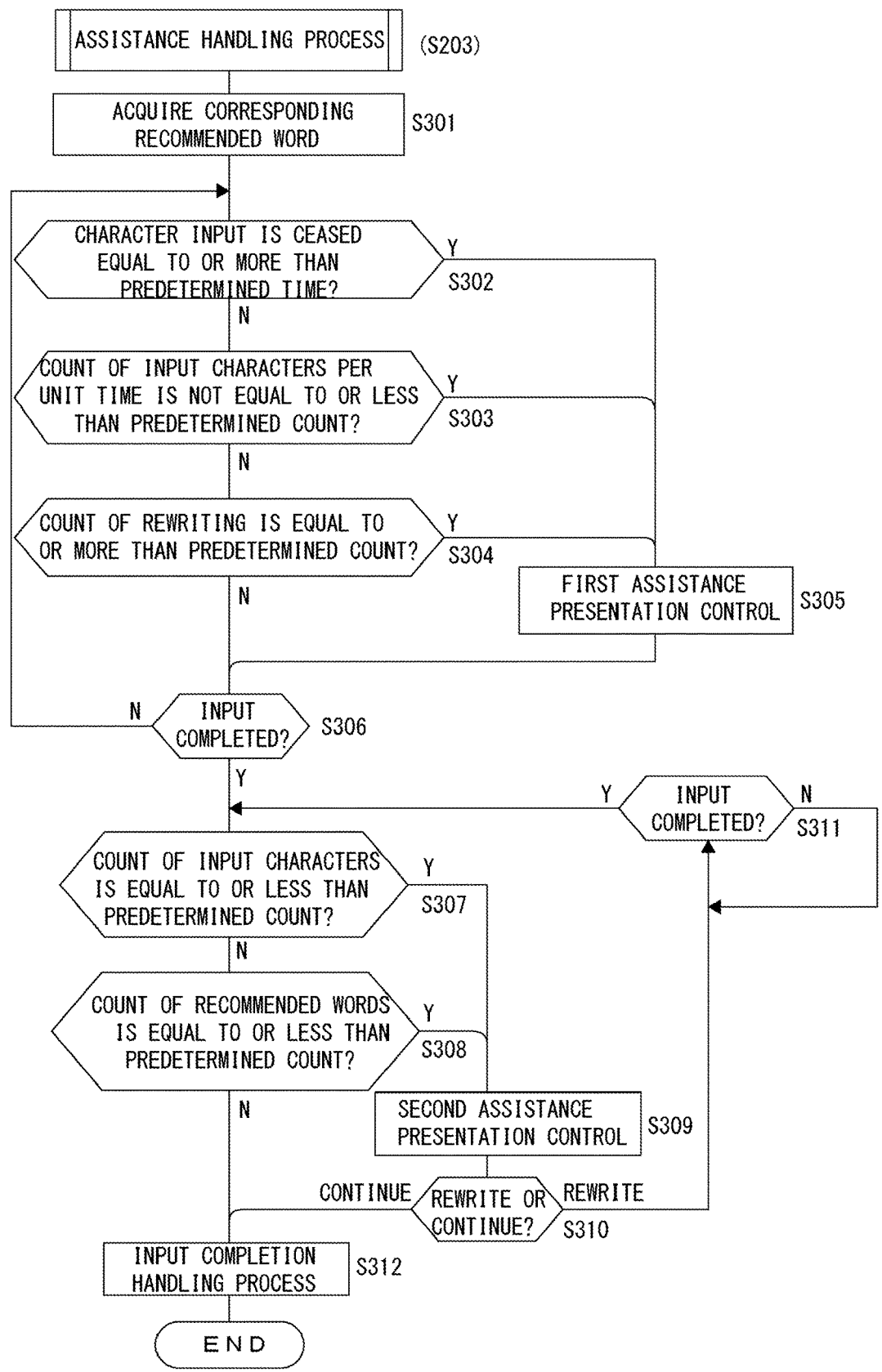
FIG. 11 is a flowchart showing a process procedure to achieve functions as the assistance timing determining section and the assistance presentation control section.

The CPU 101 in the shopping server 3a performs the processes shown in these FIG. 9 to FIG. 11, for example, in accordance with a program stored in a required storage unit, for example, the ROM 102.

First, the following describes the specific process procedure to achieve the function of the above-described frequent word managing unit 32 with reference to the flowchart in FIG. 9.

In FIG. 9, the CPU 101 detects the frequent words in the review information for each category to extract the recommended words for each category at Step S101. Specifically, the CPU 101 detects the frequent words for each category targeting the information on the review body text in the review information, which is stored in the review DB 3c. The CPU 101 extracts the detected frequent words as the recommended words for each category. In this respect, the CPU 101 refers to the above-described omit list to detect the frequent words targeting the phrase other than the common frequent words included in this omit list.

Upon extraction of the recommended words for each category at Step S101, the CPU 101 performs a process to reflect these extracted recommended words to the recommended word DB 3d at Step S102. That is, the CPU 101 updates an information content in the recommended word DB 3d to manage the extracted recommended words in units of categories.

In response to the performance of the process at Step S102, the CPU 101 terminates the processes illustrated in the drawing.

As described above, the recommended word managing unit 32 in this example continuously performs the extraction of the recommended words and the storage to the recommended word DB 3d, for example, regularly, such as every few days, or providing a required time interval, such as performance each time that the count of review posts increases by a predetermined count. On the other hand, the processes illustrated in FIG. 9 are performed regularly or each time a predetermined condition is met, such as each time the count of review posts increases by the predetermined count.

The example where the extraction process of the recommended words is collectively performed on all categories of the extraction target is described above. However, the extraction process of the recommended words may be separately performed in units of some categories.

As described above, in the case where the plurality of categories are made to correspond to the merchandise, it is only necessary to extract the recommended words targeting only a predetermined category (for example, the above-described category at the most subordinate concept hierarchy) among the plurality of categories.

With reference to the flowcharts in FIG. 10 and FIG. 11, the following describes the specific process procedures to achieve the functions as the above-described post page presentation control unit 30, assistance timing determining unit 33, and assistance presentation control unit 34.

First, in FIG. 10, the CPU 101 in the shopping server 3a waits for a request of the review post page from the user terminal 4 at Step S201. When this request is issued, the CPU 101 performs a transmitting process of the page data at Step S202. As described above, to post the review on certain merchandise, the user clicks a button for review post, which is disposed on a purchase log page for each piece of merchandise, or a button for review post, which is disposed on the merchandise web page. This allows the user to request the review post page on this merchandise. At Step S201, in response to such click of the button for review post, the CPU 101 waits for the request performed by the user terminal 4. At Step S202, in response to this request, the CPU 101 transmits the page data to cause the user terminal 4 as a request source to present the review post page on the corresponding merchandise.

As understood from the above-described description, as this page data, the page data into which the code information is embedded is created. In the code information, an instruction to cause the shopping server 3a to transmit the characters input to the body text input box p5 and the deletion information of the input characters is described.

In response to the performance of the transmitting process of the page data at Step S202, the CPU 101 performs an assistance handling process at Step S203 and terminates the processes shown in FIG. 10.

FIG. 11 shows a specific procedure of processes performed as the assistance handling process at Step S203.

First, the CPU 101 acquires the corresponding recommended word at Step S301. That is, the CPU 101 acquires the recommended words corresponding to the category to which the merchandise, which is as the merchandise of the review post target, instructed upon the above-described request at Step S201 by the user belongs from the recommended word DB 3d. Specifically, the CPU 101 refers to the merchandise DB 3b to acquire the information on the category made to correspond to the merchandise ID of this instructed merchandise. Thus, the CPU 101 acquires the information on these recommended words acquired from the recommended word DB 3d to which the information on the category is made correspond.

In the processes described later, the information on the recommended words corresponding to the category to which the merchandise of the review post target belongs is used in an assist presentation control process at Step S305 and Step S309 and the determination process at Step S308. Accordingly, a recommended word acquisition process at Step S301 can also be changed so as to be performed immediately before these processes.

In the case where the plurality of categories are made to correspond to the merchandise, the acquisition process at Step S301 uses, for example, the above-described extraction target category specification information or performing a similar operation. Thus, among the plurality of categories to which the instructed merchandise belongs, the recommended words correspond to the category target for extracting the recommended words are acquired.

In response to the performance of the recommended word acquisition process at Step S301, the CPU 101 determines whether the character input has been ceased equal to or more than the predetermined time or not at Step S302. That is, this determination process at Step S302 is equivalent to the above-described determination process (1). The determination process at Step S302 determines whether the character input to the body text input box p5 has been ceased equal to or more than one minute or not. Specifically, the determination process determines whether the character input to the body text input box p5 has ceased equal to or more than one minute from the time point at which the character input to the body text input box p5 is enabled or not.

At Step S302, in the case where a negative result that the character input has not been ceased equal to or more than the predetermined time is acquired, at Step S303, the CPU 101 determines whether the count of input characters per unit time is equal to or less than the predetermined count or not as the above-described determination process (2). Specifically, the CPU 101 determines whether the count of input characters to the body text input box p5 for three minutes is ten characters or less or not.

In the case where a negative result that the count of input characters per unit time is not equal to or less than the predetermined count is acquired at Step S303, the CPU 101 determines whether the review content has been repeatedly rewritten equal to or more than the predetermined count or not at Step S304 as the above-described determination process (3). Specifically, the CPU 101 determines whether the character input to the body text input box p5 and the deletion of these characters are repeated equal to or more than ten times or not.

In the case where a negative result that the review content has not been repeatedly rewritten equal to or more than the predetermined count is acquired at Step S304, the CPU 101 determines whether the input has been completed or not, that is, the transition instruction button p11 on the review post page has been operated or not at Step S306. When the CPU 101 acquires the negative result that the transition instruction button p11 has not been operated and therefore the input has not been completed, the CPU 101 returns the process to Step S302.

Accordingly, until operating the transition instruction button p11, the CPU 101 performs the above-described determination processes at Steps S302 to S304.

In the case where any of the determination processes at Steps S302 to S304 acquires a positive result, the CPU 101 performs a first assistance presentation control process at Step S305. That is, using the information of the recommended words, which is acquired at Step S301, the CPU 101 creates data to present the above-described assistance screen a1, which is illustrated in FIG. 7, with the pop-up window, and transmits this data to the user terminal 4 at the request source.

In response to the performance of the first assistance presentation control process at Step S305, the CPU 101 advances the process to Step S306. Accordingly, even after the assistance screen a1 is presented, until operating the transition instruction button p11, the determination processes at Steps S302 to S304 are performed. Together with this, in the case where any of the determination processes at Steps S302 to S304 acquires the positive result, the assistance screen a1 is presented again.

The count of presentations of the assistance screen a1 from when the review post page is presented until the transition instruction button p11 is operated for the first time may be restricted to a predetermined count, for example, one time.

Subsequently, in the case where the CPU 101 acquires the positive result that the transition instruction button p11 has been operated and the input has been completed at Step S306, the CPU 101 determines whether the count of input characters is equal to or less than the predetermined count or not at Step S307. This determination process at Step S307 is equivalent to the above-described determination process (4). Specifically, the determination process determines whether the count of characters input to the body text input box p5 when operating the transition instruction button p11 is equal to or less than 30 characters or not.

In the case where the CPU 101 acquires the negative result that the count of input characters is not equal to or less than the predetermined count at Step S307, the CPU 101 determines whether the recommended words is equal to or less than the predetermined count or not at Step S308. That is, as the above-described determination process (5), for example, the CPU 101 performs a process to determine whether, for example, the count of recommended words (the count of phrases matching the recommended words acquired at Step S301) in the input character string to the body text input box p5 when operating the transition instruction button p11 is equal to or less than 1 or not.

In the case where the CPU 101 acquires a negative result that the recommended words are not equal to or less than the predetermined count at Step S308, the CPU 101 performs a process corresponding to the determination of input completion at the above-described Step S306 as the input completion handling process at Step S312. Specifically, the CPU 101 performs the process described as the review post managing unit 32, that is, a presentation control process of the above-described confirmation screen. Additionally, when the post button, which is disposed at this confirmation screen, is operated, the CPU 101 performs the presentation control process of the above-described post completion screen and a process to store the input information to the review post page in the review DB 3c as the review information. This input completion handling process also performs the above-described input NG process corresponding to the case where the input condition for the required items and the character count restricting condition on the review post page are not met.

Meanwhile, in the case where any of the determination processes at Step S307 or S308 acquires the positive result, the CPU 101 performs a second assistance presentation control process at Step S309. That is, using the information of the recommended words, which is acquired at Step S301, the CPU 101 creates data to present the above-described assistance screen a2, which is illustrated in FIG. 8, with the pop-up window, and transmits this data to the user terminal 4 at the request source.

Upon performance of the second assistance presentation control process at Step S309, the CPU 101 determines which of the rewriting instruction button p23 or the continue button p24 on the assistance screen a2 has been operated at Step S310.

When acquiring the determination result that the rewriting instruction button p23 has been operated, the CPU 101 waits until the transition instruction button p11 on the review post page is operated by an input completion wait process at Step S311. As described above, upon operation of the rewriting instruction button p23 on the assistance screen a2, the assistance screen a2 is closed. This causes the input information to the review post page to transition to an editable state. The determination process at Step S311 is a process where the CPU 101 waits until the transition instruction button p11 thus in the editable state on the review post page is operated.

When the transition instruction button p11 has been operated and the input has been completed at Step S311, the CPU 101 advances the process to Step S307. Accordingly, when the transition instruction button p11 on the review post page has been operated after the presentation of the assistance screen a2, the above-described determination processes (4) and (5) are performed again. Additionally, when any of the determination processes acquires the positive result, the assistance screen a2 is presented again.

The count of presentations of the assistance screen a2 after the initial operation of the transition instruction button p11 may be restricted to the predetermined count, for example, one time. Alternatively, in the case where the assistance screen a1 has been already presented, a restriction, such as not-presentation of the assistance screen a2 may be provided.

Meanwhile, in the case where a determination result that the continue button p24 has been operated is acquired at Step S310, the CPU 101 performs the input completion handling process at Step S312. That is, in this case, since the user does not want to rewrite the review content, the CPU 101 performs processes subsequent to the presentation control of the above-described confirmation screen.

Upon performance of the input completion handling process at Step S312, the CPU 101 terminates the assistance handling process at Step S203.

When the transition instruction button p11 is operated, there may be a case where the input condition on the required items and the character count restricting condition are not met and the determination as the assistance timing is made at any of Step S307 or Step S308 simultaneously.

If such conjunction occurs, it should be considered how the presentation of the NG screen, which corresponds to the case where the required item input condition and the character count restricting condition are not met, and the presentation of the assistance screen a2 are performed. As one example, the required item input condition and the character count restricting condition are prioritized; therefore, only the NG screen is presented and the assistance screen a2 is not presented. Alternatively, such priority order is not assigned, but both the NG screen and the assistance screen a2 may be presented (for example, the NG screen and the assistance screen a2 are presented in order or are simultaneously presented). However, this case requires the rewriting of the review, the assistance screen a2 is designed without the continue button p24.

Here, the above description exemplifies the case where the target for review post is the merchandise as the real subject. However, needless to say, the target for review post also may be a service as an intangible substance.

5. Summary of Embodiments

As described above, an information processing device of this embodiment (the shopping server 3a) includes the recommended word managing unit 32, the post page presentation control unit 31, the assistance timing determining unit 33, and the assistance presentation control unit 34. The recommended word managing unit 32 is configured to extract a recommended word for each category from review information in the review DB 3c to manage the recommended word. The review DB 3c is configured to manage the review information on merchandise or a service in units of categories of the merchandise or the service. The post page presentation control unit 31 is configured to perform control such that a review post page on the specified merchandise or service is presented. The assistance timing determining unit 33 is configured to determine whether present time is assistance timing or not based on an aspect of character input to the review post page. In response to an acquisition of a determination result that the present time is the assistance timing by the assistance timing determining unit 33, the assistance presentation control unit 34 is configured to perform control such that the recommended word corresponding to the category to which the specified merchandise or service belongs is presented.

This performs assistance by presentation of the recommended words according to the category of the merchandise or the service target for review post at an appropriate timing based on the aspect of the character input to the review post page.

This allows appropriately executing the assistance related to the review description, ensuring enriching the review content together with the increase in the count of review posts.

In this case, the assistance is not by the presentation in units of sentences, such as a set phrase, but the assistance by the presentation in units of phrases as the recommended words. This also has an effect of ensuring keeping uniqueness individual to the users regarding a sentence expression as the review.

The information processing device of the embodiment is configured as follows. The assistance timing determining unit 33 is configured to determine whether the present time is the assistance timing or not. The determination is configured to determine whether the character input to the review post page has been ceased equal to or more than a predetermined time or not.

It can be inferred that the state where the character input has been ceased equal to or more than the predetermined time is a state where the user who performs the review post has no idea of what content should be described as the review and is confused. In view of this, to handle such a state, the assistance by presentation of the recommended words is allowed.

This allows appropriately assisting the user.

Furthermore, the information processing device of the embodiment is configured as follows. The assistance timing determining unit 33 is configured to determine whether the present time is the assistance timing or not. The determination is configured to determine whether a count of input characters to the review post page per unit time is equal to or less than a predetermined count or not.

It can be inferred that the state where the count of input characters per unit time is equal to or less than the predetermined count is a state where the user who performs the review post has no idea of what content should be described as the review and is confused. In view of this, to handle such a state, the assistance by presentation of the recommended words is allowed.

This allows appropriately assisting the user.

Furthermore, the information processing device of the embodiment is configured as follows. The assistance timing determining unit 33 is configured to determine whether the present time is the assistance timing or not. The determination is configured to determine whether the character input to the review post page and a deletion of this character is repeated equal to or more than a predetermined count or not.

It can be inferred that the state where the input of the characters and the deletion of these characters are repeated equal to or more than the predetermined count, that is, the state where the rewriting of the review content is repeated equal to or more than the predetermined count is a state where the user who performs the review post has no idea of what content should be described as the review and is confused. In view of this, to handle such a state, the assistance by presentation of the recommended words is allowed.

This allows appropriately assisting the user.

Furthermore, the information processing device of the embodiment is configured as follows. The assistance timing determining unit 33 is configured to determine whether the present time is the assistance timing or not. The determination is configured to determine whether a count of input characters to the review post page when an input completion button (the transition instruction button p11) is operated is equal to or less than a predetermined count or not. The input completion button is to be operated upon completion of the character input to the review post page.

It is more likely that the content of the review whose count of input characters is equal to or less than the predetermined count is not enriched. In view of this, to handle such a state, the assistance by presentation of the recommended words is allowed.

This allows appropriately assisting the user.

Furthermore, the information processing device of the embodiment is configured as follows. The assistance timing determining unit 33 is configured to determine whether the present time is the assistance timing or not. The determination is configured to determine whether a count of the recommended words in an input character string to the review post page is equal to or less than a predetermined count or not.

It is more likely that the content of the review whose count of recommended words in the input character string is equal to or less than the predetermined count is not enriched. In view of this, to handle such a state, the assistance by presentation of the recommended words is allowed.

This allows appropriately assisting the user.

Further, the information processing device of the embodiment is configured as follows. The recommended word managing unit 32 is configured to extract the recommended word for each of the categories setting one condition. The one condition is that the recommended word is a phrase frequently appearing in the review information of the category of an extraction target.

It is more likely that the phrases frequently appear in the review information for each category are keywords on the merchandise or the service of this category. The extraction of the phrases as the recommended words allows presenting phrases important to ensure the enriched description content of the review on the merchandise or the service of this category.

This allows appropriately assisting the user and also ensuring further enriched review content.

The information processing device of the embodiment is configured as follows. The recommended word managing unit 32 is configured to continuously perform the extraction of the recommended word providing a time interval.

For example, when new merchandise or a new service is released, this allows newly extracting and managing phrases for evaluation on the merchandise or the service as the recommended words.

This allows catching up with the latest trend of the merchandise or the service.

6. Programs and Storage Medium

The shopping server 3*a* as the embodiment of the information processing device according to the present invention is described above. The program of the embodiments is a program that causes the information processing device (such as a CPU) to perform the processes in the shopping server 3*a*.

A program of the embodiment causes an information processing device to perform: a recommended word managing function, a post page presentation control function, an assistance timing determining function, and an assistance presentation control function. The recommended word managing function is configured to extract a recommended word for each category from review information in the review DB 3*c* to manage the recommended word. The review DB 3*c* is configured to manage the review information on merchandise or a service in units of categories of the merchandise or the service. The post page presentation control function is configured to perform control such that a review post page on the specified merchandise or service is presented. The assistance timing determining function is configured to determine whether present time is assistance timing or not based on an aspect of character input to the review post page. In response to an acquisition of a determination result that the present time is the assistance timing by the assistance timing determining function, the assistance presentation control function is configured to perform control such that the recommended word corresponding to the category to which the specified merchandise or service belongs is presented.

That is, this program is equivalent to the program that causes the information processing device to perform the processes described in FIG. 9 to FIG. 11.

This program allows achieving the information processing devices as the above-described shopping server 3a.

Such program can be preliminary stored in an HDD as a storage medium built into a device such as a computer device, a ROM in a microcomputer including a CPU, or a similar medium. Alternatively, a removable storage medium, such as a semiconductor memory, a memory card, an optical disk, a magneto-optical disk, or a magnetic disk, can store (memorize) the program temporarily or permanently. Such removable storage medium can be provided as so-called package software.

Such program can be installed from the removable storage medium to a personal computer or a similar device. Besides, the program can also be downloaded from a download site via a network such as a LAN and the Internet.

7. Modifications

The present invention is not limited to the above-described concrete examples but various modifications are possible.

For example, the system where only the user who has purchased the merchandise or the service can post the review on the merchandise or the service is assumed above. However, it is not necessary to thus condition the purchase of the merchandise or the service as the post permission condition of the review.

The example where the recommended words are presented with the pop-up window is described above. However, the method for presenting the recommended words is not limited to this. Various presentation methods, such as the presentation in the body text input box p5, are possible.

Furthermore, the example where only the recommended words extracted from the review information are presented is described above. However, the following is also possible. The recommended words for each category are preliminary determined. The recommended words thus determined are presented together with the recommended words extracted from the review information. In this respect, in the case where the preliminary determined recommended words overlap the recommended words extracted from the review information, it is only necessary to present only one of the words.

DESCRIPTION OF REFERENCE SIGNS 1 network system
2 network
3 shopping site operating system
3a shopping server
3b merchandise DB (database)
3c review DB
3d recommended word DB
4 user terminal
5 shop terminal
30 post page presentation control unit
31 review post managing unit
32 recommended word managing unit
33 assistance timing determining unit
34 assistance presentation control unit

What is claimed is:

1. An information processing device comprising:
at least one memory configured to store computer program code; and
at least one processor configured to access said at least one memory and a database and to operate according to said computer program code, the database storing, for each category of a plurality of merchandise items and/or a plurality of service items, at least one recommended word, said computer program code including:
post page presentation control code configured to cause the at least one processor to perform control such that a review post page is presented on a display device of a user terminal in response to a request from the user terminal, wherein the review post page contains an input box to input body text of a review about a merchandise or service item specified by the request;
recommended word acquiring code configured to cause the at least one processor to acquire, in response to presentation of the review post page, at least one recommended word associated with at least one category of the specified merchandise or service item from the database;
assistance timing determining code configured to cause the at least one processor to determine whether a present time is an assistance timing or not based on an aspect of character input to the input box after the at least one recommended word is acquired; and
assistance presentation control code configured to cause the at least one processor to:
perform control such that the acquired at least one recommended word is presented in response to an acquisition, by the assistance timing determining code of a determination result indicating that the present time is the assistance timing.

2. The information processing device according to claim 1, wherein
the assistance timing determining code is further configured to cause the at least one processor to determine, before an occurrence of activation of a transition button, whether the present time is the assistance timing or not depending on whether a time since the character input to the review post page ceases is equal to or more than a predetermined time or not.

3. The information processing device according to claim 1, wherein
the assistance timing determining code is further configured to cause the at least one processor to determine, before an occurrence of activation of a transition button, whether the present time is the assistance timing or not depending on whether a count of input characters to the review post page per unit time is equal to or less than a predetermined count or not.

4. The information processing device according to claim 1, wherein
the assistance timing determining code is further configured to cause the at least one processor to determine, before an occurrence of activation of a transition button, whether the present time is the assistance timing or not depending on whether a repetition count of the character input to the review post page and a deletion of the character input is equal to or more than a predetermined count or not.

5. The information processing device according to claim 1, wherein the assistance timing determining code is further configured to cause the at least one processor to determine whether the present time is the assistance timing or not depending on whether a count of input characters in the review post page, when an input completion operation to the review post page is performed by activation of a transition button, is equal to or less than a predetermined count or not.

6. The information processing device according to claim 1, wherein
the assistance timing determining code is further configured to cause the at least one processor to determine whether the present time is the assistance timing or not depending on whether a count of the recommended words in an input character string to the review post page, after an occurrence of activation of a transition button, is equal to or less than a predetermined count or not.

7. The information processing device according to claim 1, wherein the computer program code further includes recommended word managing code configured to cause the at least one processor to extract the recommended word based on a condition that the recommended word is a phrase frequently appearing in the review information of a category of an extraction target.

8. The information processing device according to claim 1, wherein the computer program code further includes recommended word managing code configured to cause the at least one processor to continuously extract the recommended word at a predetermined time interval.

9. An information processing method performed by an information processing device configured to access a database, the database storing, for each category of a plurality of merchandise items and/or a plurality of service items, at least one recommended word, the information processing method comprising:
extracting a recommended word for each category from review information in a review database and to manage the recommended word, the review database being configured to manage the review information on merchandise or a service in units of categories of the merchandise or the service;
performing control such that a review post page is presented on a display device of a user terminal in response to a request from the user terminal, wherein the review post page contains an input box to input body text of a review about a merchandise or service item specified by the request on the specified merchandise or service is presented;
acquiring, in response to presentation of the review post page, at least one recommended word associated with at least one category of the specified merchandise or service item from the database;
determining whether a present time is an assistance timing or not based on an aspect of character input to the review post page input box after the at least one recommended word is acquired; and
performing control such that the acquired at least one recommended word corresponding to the category to which the specified merchandise or service belongs is presented in response to an acquisition, by the assistance timing determining code of a determination result indicating that the present time is the assistance timing by the assistance timing determining unit.

10. The information processing method according to claim 9, wherein whether the present time is the assistance timing or not is determined, before an occurrence of activation of a transition button, depending on whether a time since the character input to the review post page ceases is equal to or more than a predetermined time or not.

11. The information processing method according to claim 9, wherein
whether the present time is the assistance timing or not is determined, before an occurrence of activation of a transition button, depending on whether a count of input characters to the review post page per unit time is equal to or less than a predetermined count or not.

12. The information processing method according to claim 9, wherein
whether the present time is the assistance timing or not is determined, before an occurrence of activation of a transition button, depending on whether a repetition count of the character input to the review post page and a deletion of the character input is equal to or more than a predetermined count or not.

13. The information processing method according to claim 9, wherein
whether the present time is the assistance timing or not is determined, before an occurrence of activation of a transition button, depending on whether a count of input characters in the review post page when an input completion operation to the review post page is performed by activation of the transition button, is equal to or less than a predetermined count or not.

14. The information processing method according to claim 9, wherein
whether the present time is the assistance timing or not is determined depending on whether a count of recommended words in an input character string to the review post page, after an occurrence of activation of a transition button, is equal to or less than a predetermined count or not.

15. The information processing method according to claim 9, wherein
the recommended word is extracted based on a condition that the recommended word is a phrase frequently appearing in the review information of a category of an extraction target.

16. The information processing method according to claim 9, wherein
the recommended word is continuously extracted at a predetermined time interval.

17. The information processing device according to claim 1,
wherein the post page presentation control code is further configured to cause the at least one processor to arrange a transition button on the review post page, wherein an activation of the transition button is associated with an instruction to the information processing device to transition to a confirmation screen when an entry of the body text is complete,
wherein the assistance timing determining code is further configured to cause the at least one processor to determine whether the present time is the assistance timing or not based on whether the activation of the transition button has occurred, and
wherein the assistance timing determining unit code is further configured to cause the at least one processor to determine whether the present time is the assistance timing or not depending on whether a count of input characters in the review post page, when an input completion operation to the review post page is performed by the activation of the transition button, is equal to or less than a predetermined count or not.

18. The information processing device according to claim 17,
wherein the assistance timing determining code is further configured to cause the at least one processor to determine whether a present time is an assistance timing or not based on the aspect of character input to the review post page, wherein the aspect of character input corresponds to:
A) before an activation of the transition button: i) whether a time since the character input to the review post page ceases is equal to or more than a predetermined time or not, ii) whether a count of input characters to the review post page per unit time is equal to or less than a predetermined count or not, iii) whether the a repetition count of the character input to the review post page and the a deletion of the character input is equal to or more than the a predetermined count or not, or
B) after an activation of the transition button: i) whether a count of input characters in the review post page is equal to or less than a predetermined count or not, or ii) whether a count of recommended words in an input character string to the review post page is equal to or less than a predetermined count or not.

19. The information processing device according to claim 1, wherein the computer program code further includes recommended word managing code configured to cause the at least one processor to:
i) extract a recommended word for each category from review information in a review database and to manage the recommended word, the review database being configured to manage the review information with respect to a plurality of merchandise items and/or a plurality of service items for each category of the plurality of the merchandise items and/or the plurality of service items, and
ii) store the recommended word in a recommended word database.

20. The information processing device according to claim 19, wherein the recommended word managing code is further configured to cause the at least one processor to extract the recommended word for each category from review information in the review database based on: i) a detection of frequent words present in the review information and associated with the corresponding category, or ii) a detection of phrases including a keyword, wherein the keyword is preset for each category.

* * * * *